(12) United States Patent
Lee

(10) Patent No.: US 7,124,880 B2
(45) Date of Patent: Oct. 24, 2006

(54) FEEDING DEVICE WITH A PIVOTABLE PUSHING MEMBER

(75) Inventor: Shih-Ming Lee, Taiping (TW)

(73) Assignee: Pro Machinery Co., Ltd., Taichung County (TW)

( * ) Notice: Subject to any disclaimer, the term of this patent is extended or adjusted under 35 U.S.C. 154(b) by 0 days.

(21) Appl. No.: 11/268,461

(22) Filed: Nov. 8, 2005

(65) Prior Publication Data

US 2006/0124436 A1 Jun. 15, 2006

(30) Foreign Application Priority Data

Nov. 26, 2004 (CN) .............................. 93219092 U

(51) Int. Cl.
 *B65G 19/00* (2006.01)
(52) U.S. Cl. .................... 198/717; 414/18; 82/124; 82/126
(58) Field of Classification Search ............... 198/717, 198/732, 526, 530, 531; 414/14, 18; 82/124, 82/125, 126, 127

See application file for complete search history.

(56) References Cited

U.S. PATENT DOCUMENTS

| | | | | |
|---|---|---|---|---|
| 3,941,256 A | * | 3/1976 | Doe et al. .................... | 414/17 |
| 5,567,195 A | * | 10/1996 | Tufts et al. .................. | 451/11 |
| 6,024,002 A | * | 2/2000 | Ravaioli et al. .............. | 82/127 |
| 6,199,461 B1 | * | 3/2001 | Geiser ......................... | 82/124 |
| 6,302,005 B1 | * | 10/2001 | Albasateneh ................. | 82/126 |

* cited by examiner

*Primary Examiner*—James R. Bidwell
(74) *Attorney, Agent, or Firm*—Rosenberg, Klein & Lee

(57) ABSTRACT

A feeding device includes a rail with a feeding unit and a pushing unit located on two sides of the rail. The feeding unit has a transverse member on which the cylindrical pieces are located and a pivotable arm pivotably connected to the transverse member to push the cylindrical pieces. The pushing unit has at least one connection member connected to the rail and a slot is defined through the connection member. A pushing member is pivotably connected to the connection member and a bolt extends through the pushing member and the slot so that the pushing member can be pivoted along the second slot when in maintenance.

1 Claim, 4 Drawing Sheets

FEEDING DEVICE WITH A PIVOTABLE PUSHING MEMBER

FIELD OF THE INVENTION

The present invention relates to a feeding device for feeding cylindrical pieces into CNC lathe and the feeding device includes a pivotable pushing member which is easily to pivot an angle when in maintenance.

BACKGROUND OF THE INVENTION

A conventional feeding device for feeding cylindrical pieces into a CNC lathe is shown in FIG. 4 and generally includes a base 6 on which a rail 61 is connected and the rail 61 has a fixed length and a feeding unit (not shown) and a pushing unit 62 are located on two sides of the rail 61. A guide member 63 is located between the rail 61 and the base 6 so that the feeding device can be slidable on the base 6 when needed. The feeding unit 62 are located corresponding to the main shaft of the lathe and the cylindrical pieces are fed into the CNC lathe and clamped by chucks so as to be machined by the lathe. There is only a small gap defined between feeding hole of the main shaft and the feeding unit 62 so that when in maintenance, the bolts 64 have to be loosened to let the feeding unit 62 be slidable on the guide member 63. By this way, the maintainers have sufficient space to maintain the feeding device. This is a time-consuming task and requires a large space to maintain the feeding device.

The present invention intends to provide a feeding device wherein the pushing member can be pivotable along a curve slots in the connection member so that the maintainers can easily access the pushing member when in maintenance.

SUMMARY OF THE INVENTION

The present invention relates to a feeding device which includes a base on which a rail is connected. A feeding unit and a pushing unit are respectively located on two sides of the rail. The feeding unit includes a transverse member and a pivotable arm pivotably connected to the transverse member. The pivotable arm has a first slot and a first bolt extends through the first slot and is connected to the rail so that the pivotable arm is pivotable within a range of the first slot. The pushing unit has at least one connection member connected to the rail and a second slot is defined through the connection member. A pushing member is connected to an intermediate member which is pivotably connected to the connection member. A second bolt extends through the intermediate member and the second slot so that the pushing member can be pivoted along the second slot.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
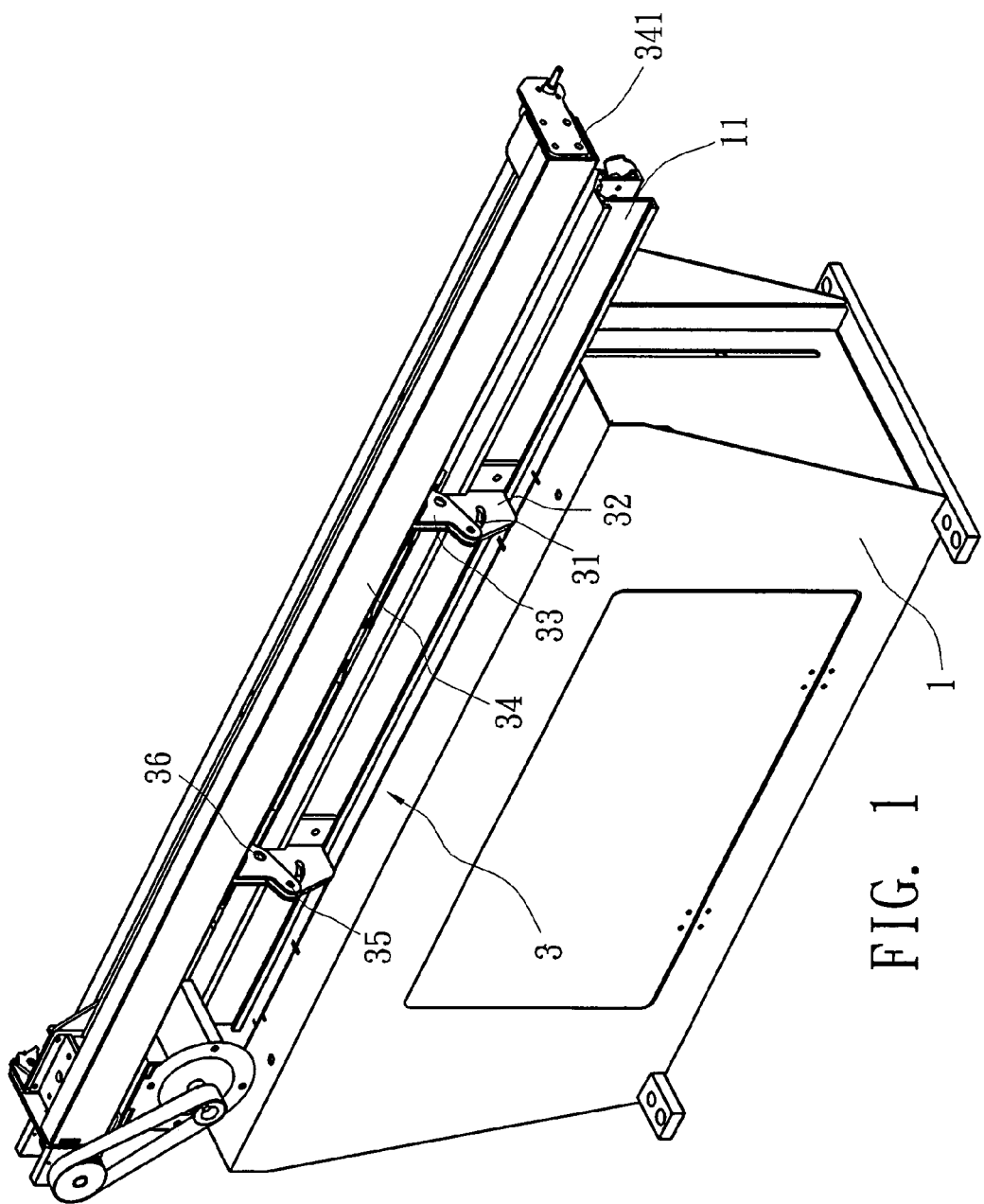
FIG. 1 is a perspective view to show the feeding device of the present invention.
Figure 2:
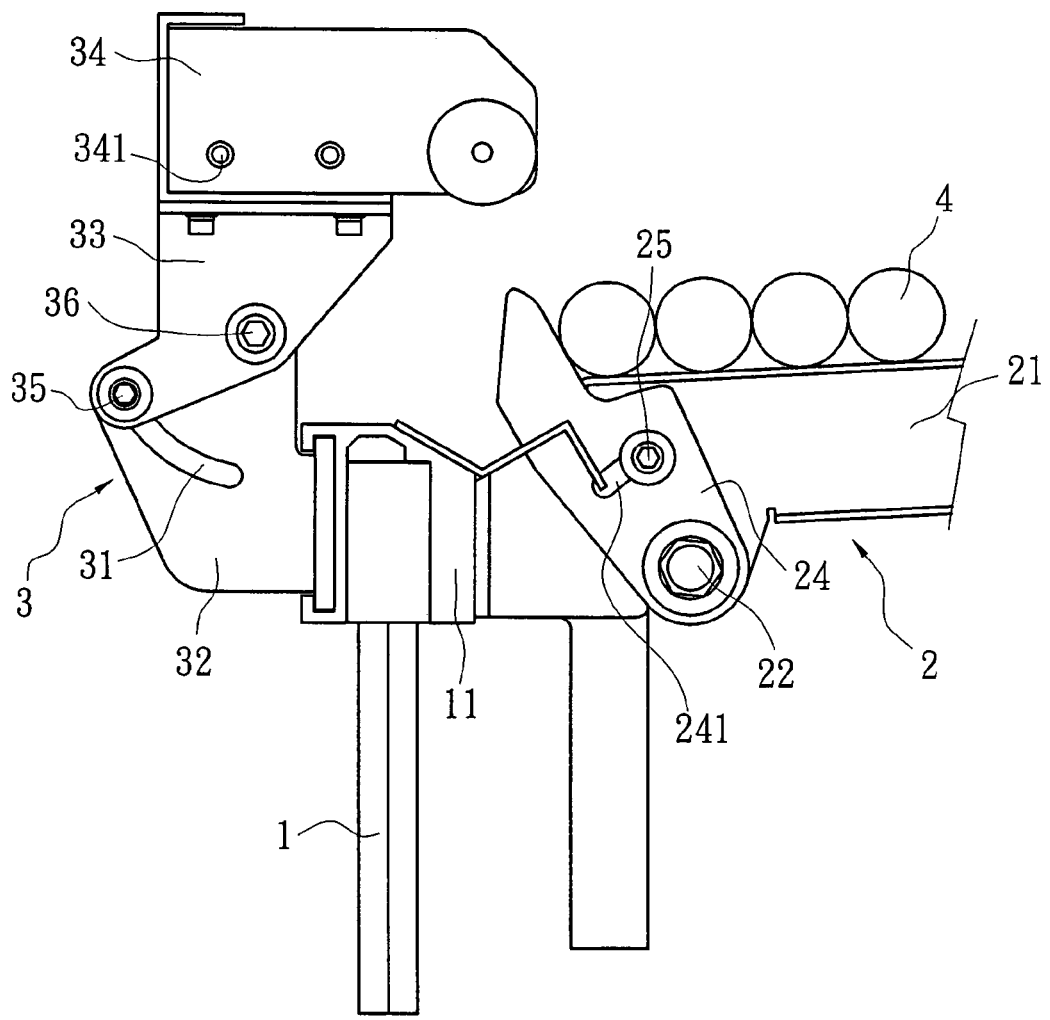
FIG. 2 shows that the feeding device includes a feeding unit and a pushing unit.

Referring to FIGS. 1 and 2, the a feeding device of the present invention comprises a base 1 and a rail 11 is connected on the base 1. A feeding unit 2 and a pushing unit 3 are respectively located on two sides of the rail 11. The feeding unit 2 includes a transverse member 21 on which the cylindrical pieces 4 to be sent to the CNC lathe (not shown) are put. A pivotable arm 24 is pivotably connected to the transverse member 21 by a first pivot 22 and the pivotable arm 24 has a first slot 241 defined therethrough. A first bolt 25 extends through the first slot 241 and is connected to the rail 11 so that the pivotable arm 24 is pivotable about the first pivot 22 within a range of the first slot 241.

Figure 3:
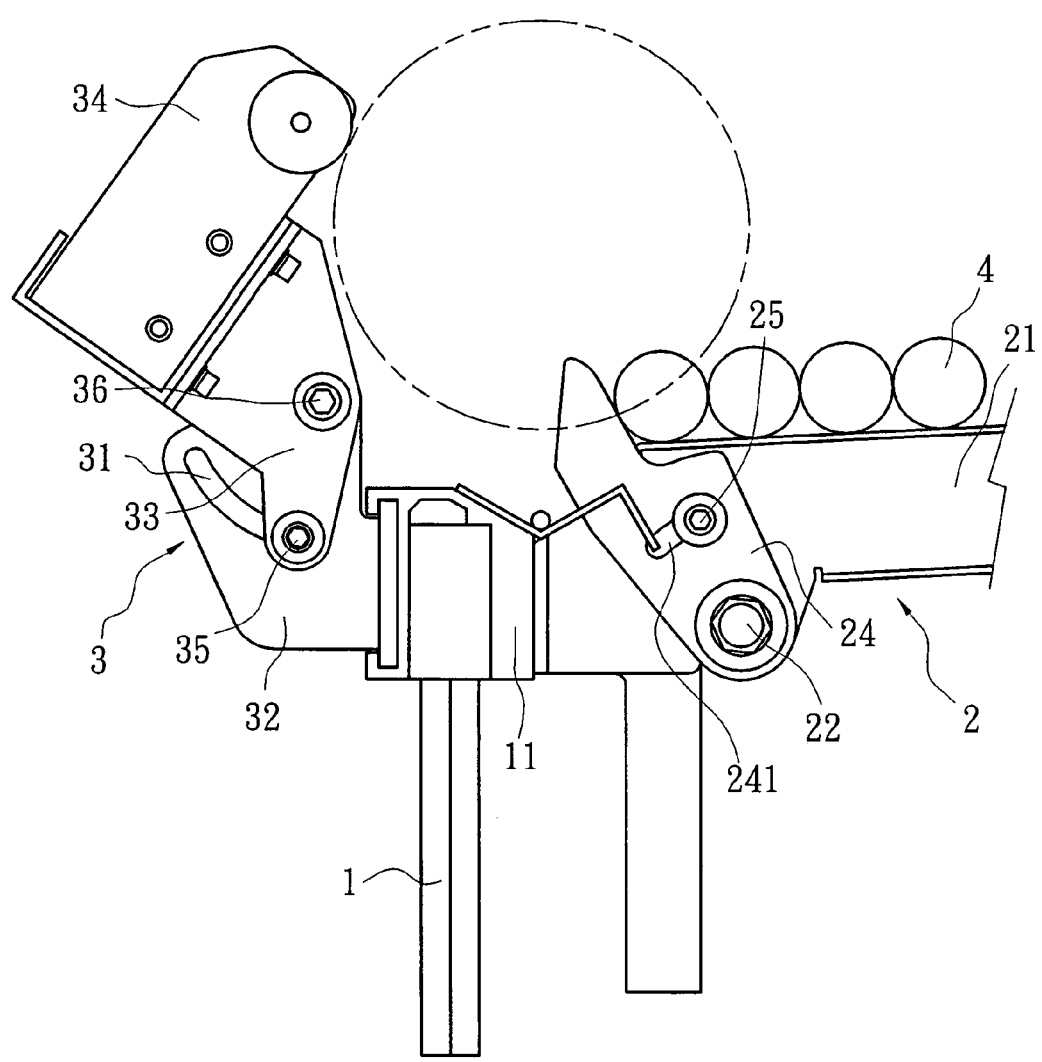
FIG. 3 shows that the pushing unit can be pivoted.
Figure 4:
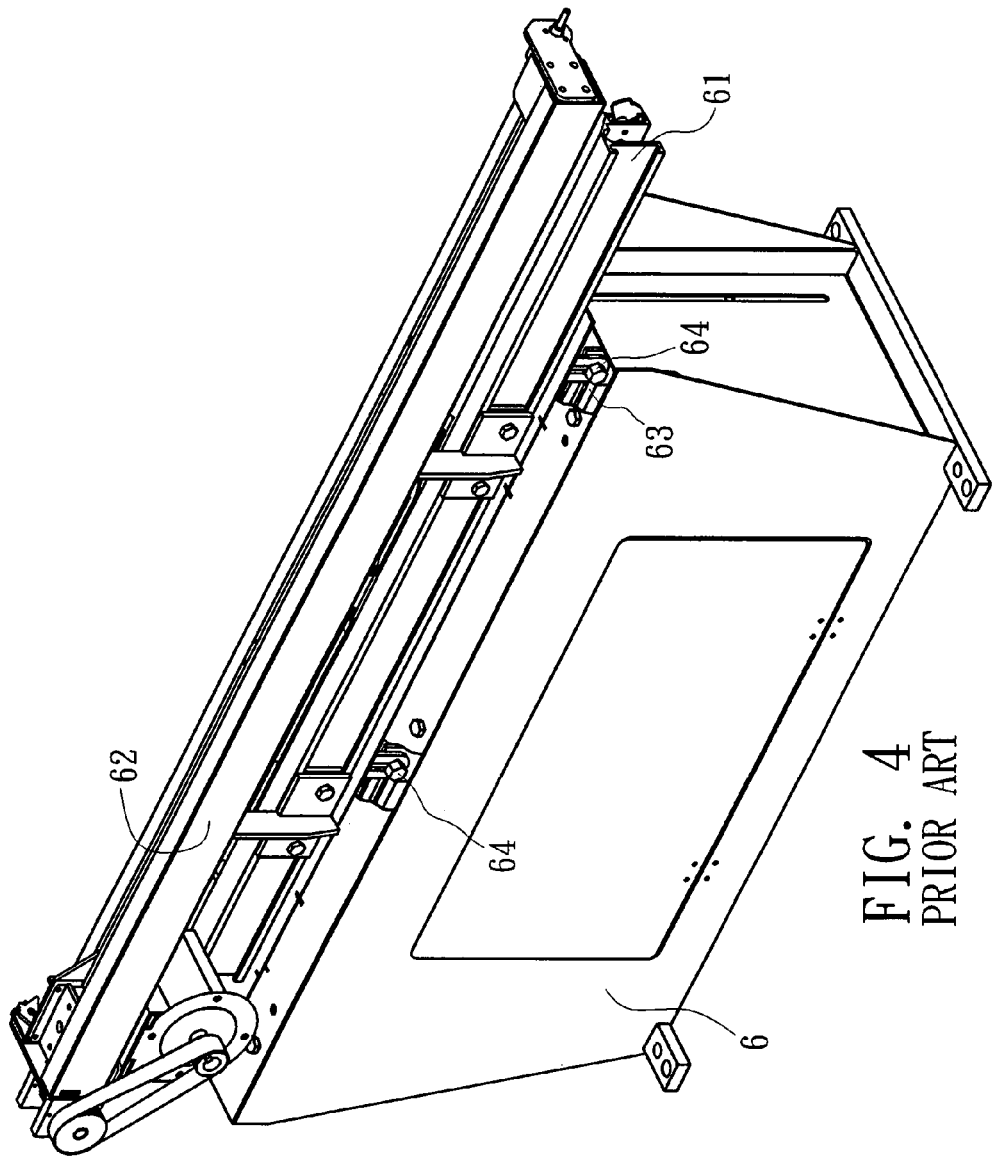
FIG. 4 shows a conventional the feeding device of the present invention.

The pushing unit 3 includes two connection members 32 connected to the rail 11 and each connection member 32 has a second slot 31 defined therethrough. A pushing member 34 is connected to an intermediate member 33 which is pivotably connected to the connection members 32 by two respective second pivots 36. Two second bolts 35 extend through the two intermediate members 33 and the two second slots 31 so that the pushing members 34 can be pivoted along the second slots 31 as shown in FIG. 3. The pushing member 34 has a plurality of pushing rods 341 connected thereto so as to push the cylindrical pieces 4.

When operating the feeding device, the pushing member 34 can be fixed in position by tightening the second bolts 35 and the second pivots 36. The cylindrical pieces 4 are then pushed into the CNC lathe by the pushing rods 341 and clamped by the chucks in the CNC lathe.

When in maintenance, referring to FIG. 3, the maintainers loosen the second bolts 35 and the second pivots 36 first, the intermediate members 33 together with the pushing members 34 can be pivoted about the second pivots 36, and the second bolts 35 are moved within the second slots 31. After the pushing member 34 is pivoted, the second bolts 35 and the second pivots 36 are then tightened again such that the maintainers can conveniently access the pushing member 34.

While we have shown and described the embodiment in accordance with the present invention, it should be clear to those skilled in the art that further embodiments may be made without departing from the scope of the present invention.

What is claimed is:

1. A feeding device comprising:

a base and a rail connected on the base, a feeding unit and a pushing unit respectively located on two sides of the rail, the feeding unit having a transverse member and a pivotable arm pivotably connected to the transverse member by a first pivot, the pivotable arm having a first slot and a first bolt extending through the first slot and connected to the rail so that the pivotable arm is pivotable about the first pivot within a range of the first slot, and the pushing unit having at least one connection member connected to the rail and a second slot defined through the at least one connection member, a pushing member connected to an intermediate member which is pivotably connected to the at least one connection member by a second pivot, a second bolt extending through the intermediate member and the second slot so that the pushing member can be pivoted along the second slot, the pushing member having a plurality of pushing rods connected thereto.

* * * * *